United States Patent
Kato

(10) Patent No.: US 7,055,696 B2
(45) Date of Patent: Jun. 6, 2006

(54) ROTARY VALVE TYPE MAGNETIC FOREIGN MATTER REMOVER

(75) Inventor: Fumio Kato, Handa (JP)

(73) Assignee: Tsukasa Industry Co., Ltd., Aichi (JP)

( * ) Notice: Subject to any disclaimer, the term of this patent is extended or adjusted under 35 U.S.C. 154(b) by 1189 days.

(21) Appl. No.: 10/296,156

(22) PCT Filed: May 9, 2001

(86) PCT No.: PCT/JP01/03880

§ 371 (c)(1),
(2), (4) Date: Nov. 22, 2002

(87) PCT Pub. No.: WO01/89970

PCT Pub. Date: Nov. 29, 2001

(65) Prior Publication Data

US 2005/0247734 A1    Nov. 10, 2005

(30) Foreign Application Priority Data

May 23, 2000 (JP) .............................. 2000-151817

(51) Int. Cl.
*B03C 1/00* (2006.01)
(52) U.S. Cl. ...................................... 209/219; 209/228
(58) Field of Classification Search ................. 209/37, 209/217, 219, 221, 222, 228, 232, 372

See application file for complete search history.

(56) References Cited

U.S. PATENT DOCUMENTS

| | | | | |
|---|---|---|---|---|
| 5,427,249 A | * | 6/1995 | Schaaf | 209/223.2 |
| 5,791,492 A | * | 8/1998 | Reali et al. | 209/221 |
| 5,819,949 A | * | 10/1998 | Schaaf et al. | 209/223.2 |
| 5,860,532 A | * | 1/1999 | Arvidson | 209/212 |
| 6,077,333 A | * | 6/2000 | Wolfs | 96/1 |
| 6,902,066 B1 | * | 6/2005 | Yang | 209/223.1 |

FOREIGN PATENT DOCUMENTS

| | | |
|---|---|---|
| JP | 6039346 | 3/1985 |
| JP | 199444 | 7/1989 |
| JP | 08169560 | 7/1996 |
| JP | 08169560 A * | 7/1996 |

* cited by examiner

*Primary Examiner*—Joseph C. Rodriguez
(74) *Attorney, Agent, or Firm*—Mattingly, Stanger, Malur & Brundidge, P.C.

(57) ABSTRACT

A rotary valve allowing a rotor to be stored rotatably in a tubular powder granular material feeding chamber in a casing, storing and feeding powder granular material received from a powder granular material feed port to the troughs of the rotor, and discharging the powder granular material from a powder granular material discharge port to the outside, wherein an inspection hole having an openable inspection door is provided in the casing, a magnetic foreign matter attracting member formed of a plurality of magnets is installed in the troughs so as to allow to rotate integrally with the rotor, magnetic foreign matter mixed in the powder granular material is attracted to the magnetic foreign matter attracting members, and the said inspection door is opened to allow the magnetic foreign matter to be removed.

4 Claims, 10 Drawing Sheets

(a)

(b)

(a)

(b)

ROTARY VALVE TYPE MAGNETIC FOREIGN MATTER REMOVER

TECHNICAL FIELD

The present invention relates to a rotary valve type magnetic foreign matter removal device that separates and removes magnetic foreign matter mixed in powder granular material.

PRIOR ART

As a prior art, Japanese published unexamined utility model application No. H1-99444 teaches an iron removal device removing iron impurities or iron powder mixed in powder granular material. The device comprises a cylindrical body that powder granular material is passed through, and a plurality of bar magnets that are arranged around an axis perpendicular to a length direction of the body inside the cylindrical body with running parallel to the axis, wherein a plurality of bar magnets rotates around the axis integrally. Several bar magnets are arranged in a direction perpendicular to a direction that powder granular material falls, by arranging the iron removal device in an appointed place of a pipe. Because the magnets rotates at a regular speed around the axis, falling powder granular material is dispersed and touches top and bottom of the magnet at least twice, the magnets efficiently attracts a very small amount of iron powder etc. that was hard to remove in old-type device. There is no fear that the pipe is clogged with overlapped powder granular material because the bar magnets are not lattice type as old-type device and always rotates. When an interval of the bar magnets is large, powder granular material is hard to come to touch the bar magnets. On the contrary, when an interval of the bar magnets is too small, the pipe is clogged up if the fluidity of the powder granular material is bad. It is necessary to arrange the magnets at appropriate intervals.

However, in this prior art device there is a disadvantage that adsorption rate is worse because the falling powder granular material contacts with the bar magnets at very few times, and is dispersed with scattering by the bar magnet rotation. For example, in flour milling factories that a ceiling is high and a slant degree of laying pipe is large, a removal rate is low because a powder granular material falling from a height of 10 m to 20 m touches the bar magnet in a moment. Increasing the removal efficiency of the iron matter is expected. Because there is no function except for removing iron in the iron removal device, a space for removing iron use only is necessary. Further, because a dead space is needed for falling powder granular material, miniaturization of the whole device is difficult, and there is a problem that the powder granular material stuck into the dead space may be spoiled and contamination may be produced.

An object of the present invention is to provide a rotary valve type magnetic foreign matter removal device, which a separation removal rate of the magnetic foreign matter mixed in the powder granular material is improved, a pneumatic-conveyance function or an air locker function is added besides the magnetic foreign matter removal, the size reduction of the whole device is attained.

DISCLOSURE OF THE INVENTION

In view of these various problems, the invention described a rotary valve type magnetic foreign matter removal device comprising: a rotary valve allowing a rotor to be stored rotatably in a tubular powder granular material feeding chamber in a casing, storing and feeding powder granular material received from a powder granular material feed port to a trough of the rotor, and discharging the powder granular material from a powder granular material discharge port to the outside, and having an inspection door that opens and closes an inspection hole provided in the casing, a magnetic foreign matter attracting member having a plurality of magnets that is installed in the trough of the rotor, and rotating integrally with the rotor, wherein magnetic foreign matter mixed in the powder granular material are attached to the magnetic foreign matter attracting member, wherein the inspection door is opened to allow the magnetic foreign matter attached to the magnetic foreign matter attracting member to be removed. The rotary valve with a feed port and a discharge port in the upper direction and the lower direction is preferable, but either the one in the right and left direction or the one in the axis direction may be used. The magnetic foreign matter attracting member can be installed in the rotor or a fixable member that can be fixed to the rotor. As a magnetic foreign matter attracting member, the one that attracts directly it by the magnets is suitable, and also the one that attracts indirectly it by magnetic covered with non-magnetic cover is suitable. When the inspection door is opened, it is preferable that both of the rotor and the magnetic foreign matters attracting member or magnetic foreign matters attracting member alone can be took out. It is used as the magnetic foreign matters attracting member, for example cylinder shape, plate shape, spherical shape, oval shape, and elliptical shape, etc. The magnetic foreign matter attracting member may be installed at the directions such as parallel direction, vertical direction, slant direction to a spindle line direction of the rotor.

The invention described an embodiment of a rotary valve type magnetic foreign matter removal device comprising: a casing allowing a powder granular material feed port and a powder granular material discharge port to be installed in an upper direction and a lower direction, and having a powder granular material feeding chamber being connected to the powder granular material feed port and the powder granular material discharge port, an axis installed rotatably in the casing, a rotor fixed to the axis and allowing the powder granular material feeding chamber to define so as to form a plurality of the troughs by having a plurality of blades extending radially, magnetic foreign matter attracting member having a plurality of magnets that are installed to go through the troughs in a direction of the axis and rotateing integrally with the rotor and the axis, a drive side plate having a drive side bearing that props up rotatably the axis, a follower side plate having an inspection hole, an inspection door opening and closing the inspection hole, wherein the powder granular material is poured from the powder granular material feed port into the troughs, the magnetic foreign matter mixed in the powder granular material are attached to the magnetic foreign matter attracting member with rotating the rotor, the powder granular material is discharged from the powder granular material discharge port. Thereby the above-mentioned object is accomplished effectively.

The invention described a rotary valve type magnetic foreign matter removal device, wherein a magnet foreign matter attracting member comprising: fixable plates fixed to the rotor to rotate integrally with the rotor relative to the casing, non-magnetized or a very little magnetized cylindrical covers fixed to the fixable plates or attached to the fixable plates with detachability, allowing the magnets to be put into or put out. Thereby the above-mentioned object is accomplished effectively and the collection of the magnetic foreign matters is performed easily.

The invention described a rotary valve type magnetic foreign matter removal device, wherein the magnets are attached to the rotor with detachability. Thereby the above-mentioned object is accomplished effectively and the collection of the magnetic foreign matters is performed easily.

The invention described a rotary valve type magnetic foreign matter removal device, wherein the magnets are bar magnets. Thereby the above-mentioned object is accomplished effectively and which makes maintenance etc. easier.

BRIEF DESCRIPTION OF THE DRAWINGS

FIG. 5 (b) is a partial enlarged sectional view of the magnet and the non-magnetized cover.

BEST MODES OF CARRYING OUT THE INVENTION

Figure 1:
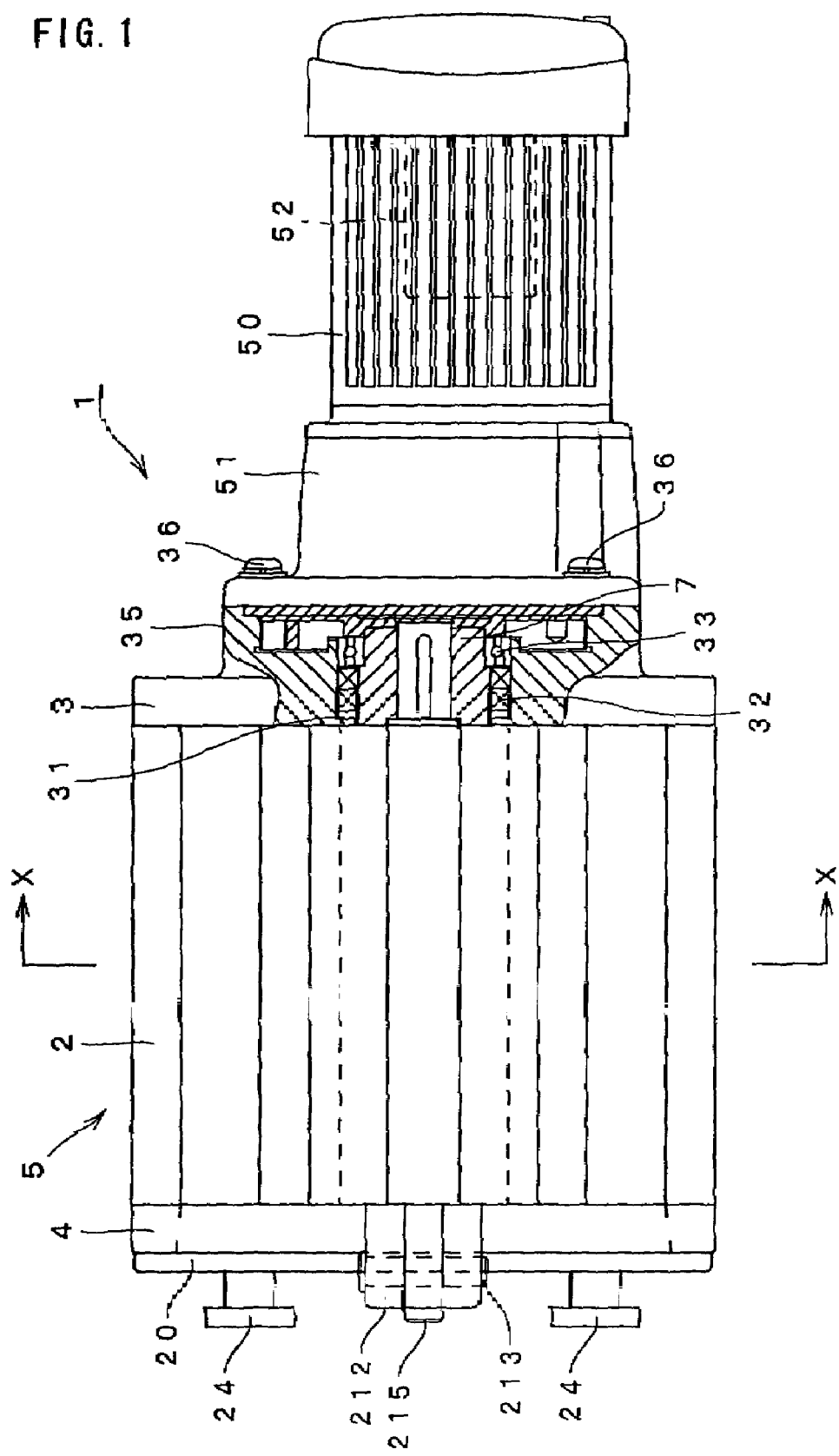
FIG. 1 is a partial broken front view of a rotary valve type magnetic foreign matter removal device according to an embodiment of the present invention.

A rotary valve type magnetic foreign matter removal device 1 in a preferred embodiment of the present invention is described below with reference to FIGS. 1 through 10. As shown in FIGS. 1 through 6, the rotary valve type magnetic foreign matter removal device 1 includes a pair of surface plates 2 that the shape looks like a tile with an arc surface 2a (refer to FIG. 5) on the center portion of the inner wall with the outer surface wall being cut like a crystal glass, a drive side plate 3 whose end is fixed to a power supplying side of a pair of surface plates 2 so as to connect each other orthogonally by bolts 3a (refer to FIG. 6) and having a center through hole 30 (refer to FIG. 7), a power receiving side plate 4 whose end is fixed to a follower side of a pair of surface plates 2 so as to connect each other orthogonally by bolts 4a (refer to FIG. 4) and having a big diameter inspection hole 40 (refer to FIG. 8), a powder granular material feeding chamber 6 (refer to FIG. 5) enclosed by a body casing 5 made of light metals which is composed of the surface plate 2, a drive side plate 3, a follower side plate 4, and an inspection door 20 that will be described later, an axis 7 (Refer to FIG. 5,7) made of a stainless steel which is orthogonally installed to the drive side plate 3 and the follower side plate 4 so as to be supported rotatably at one end and a rotor 8 (Refer to FIG. 5) fixed to the axis 7. The axis 7 has a bearing in one end when the inspection door 20 is opened, while the inspection door 20 is closed and the rotor 8 rotates.

Figure 2:
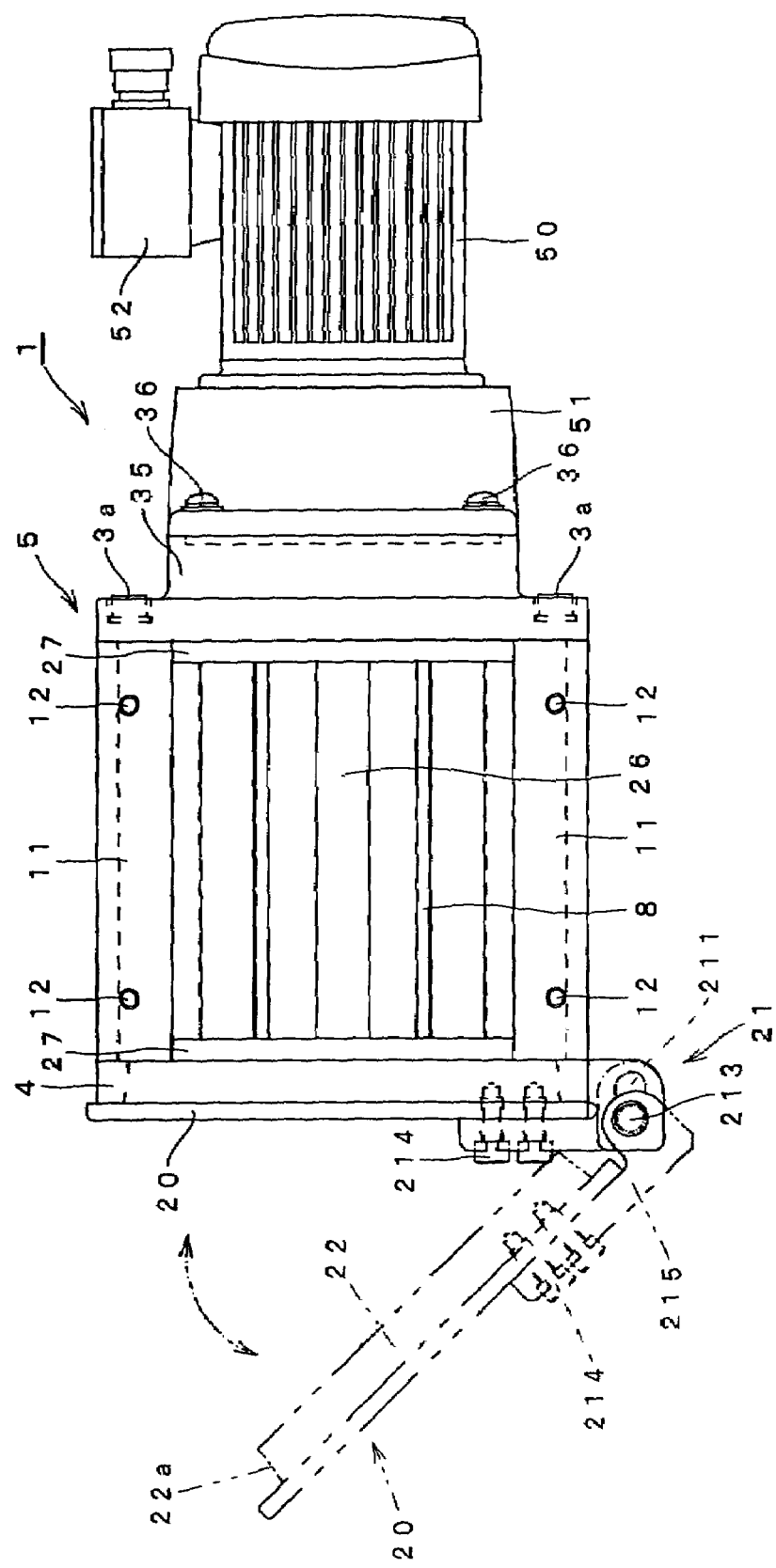
FIG. 2 is a plan view of a rotary valve type magnetic foreign matter removal device according to an embodiment of the present invention.
Figure 3:
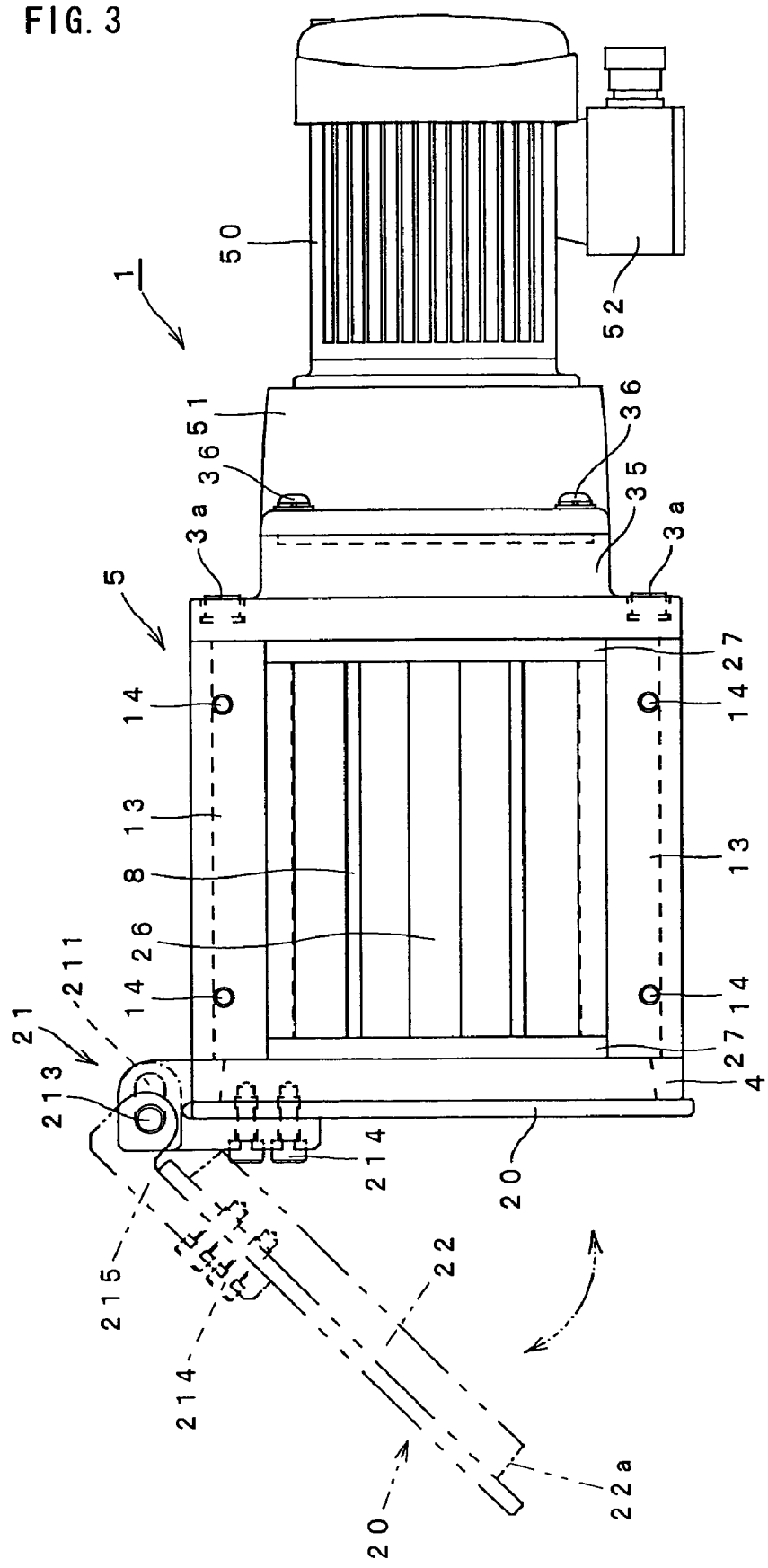
FIG. 3 is a bottom plan view of a rotary valve type magnetic foreign matter removal device according to an embodiment of the present invention.
Figure 4:
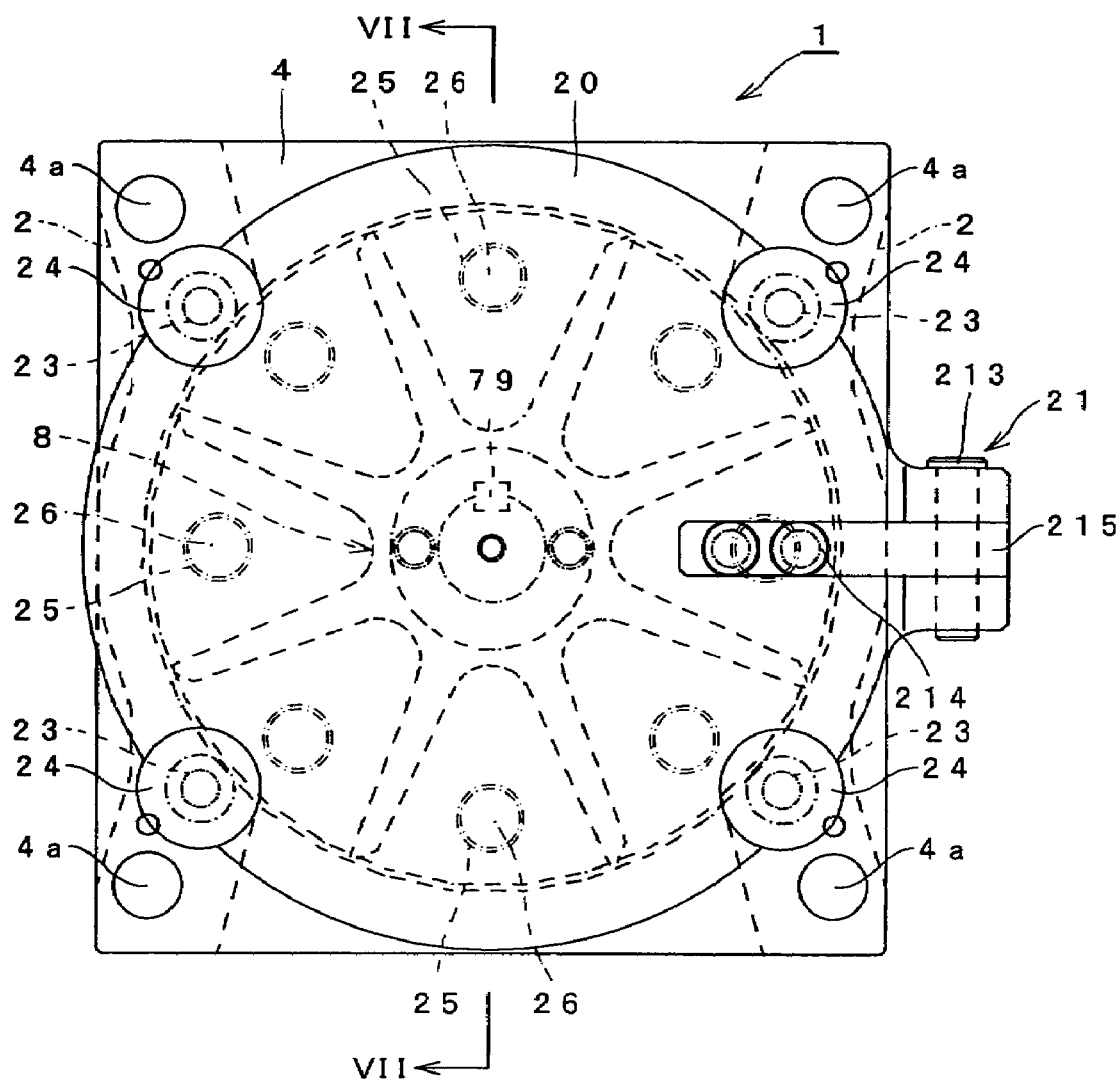
FIG. 4 is a left side elevation view of a rotary valve type magnetic foreign matter removal device according to an embodiment of the present invention.
Figure 5:
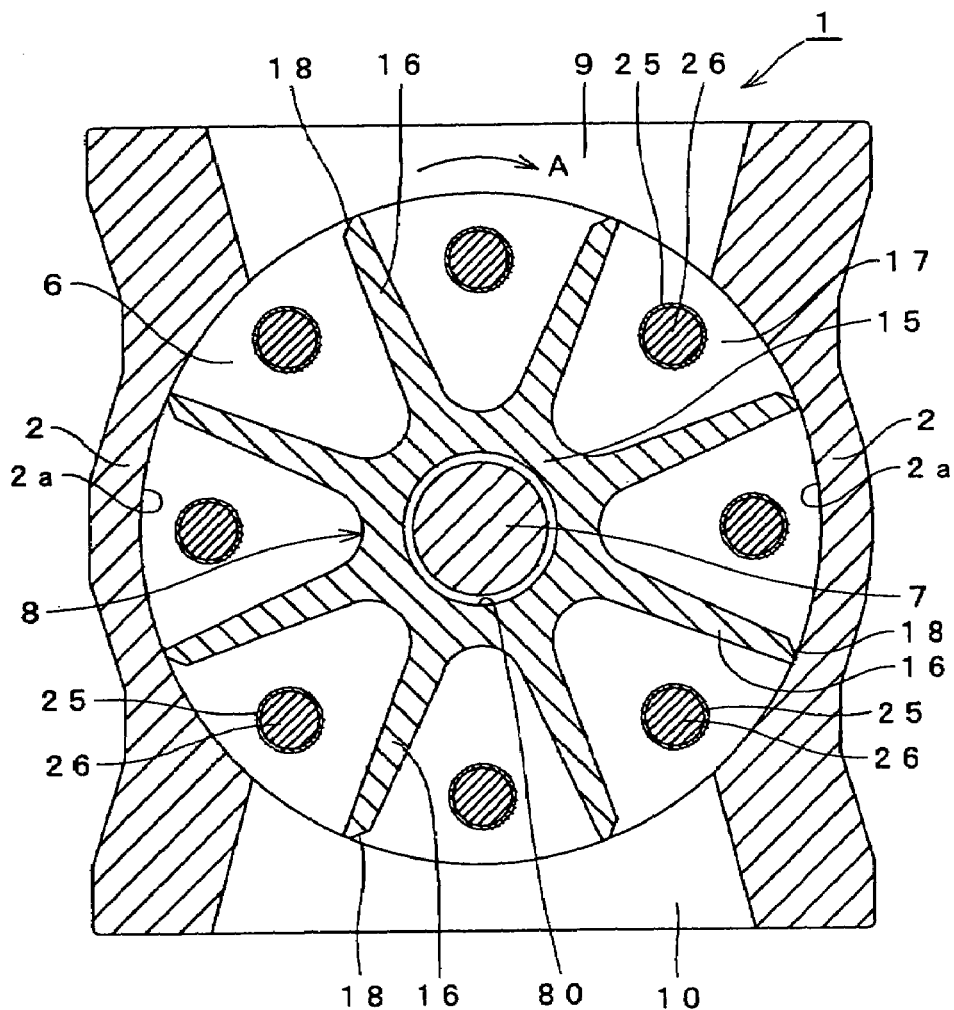
FIG. 5 (a) is a sectional view taken on the line X—X in FIG. 1.
Figure 5:
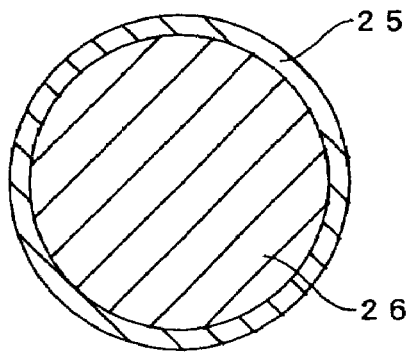
Figure 6:
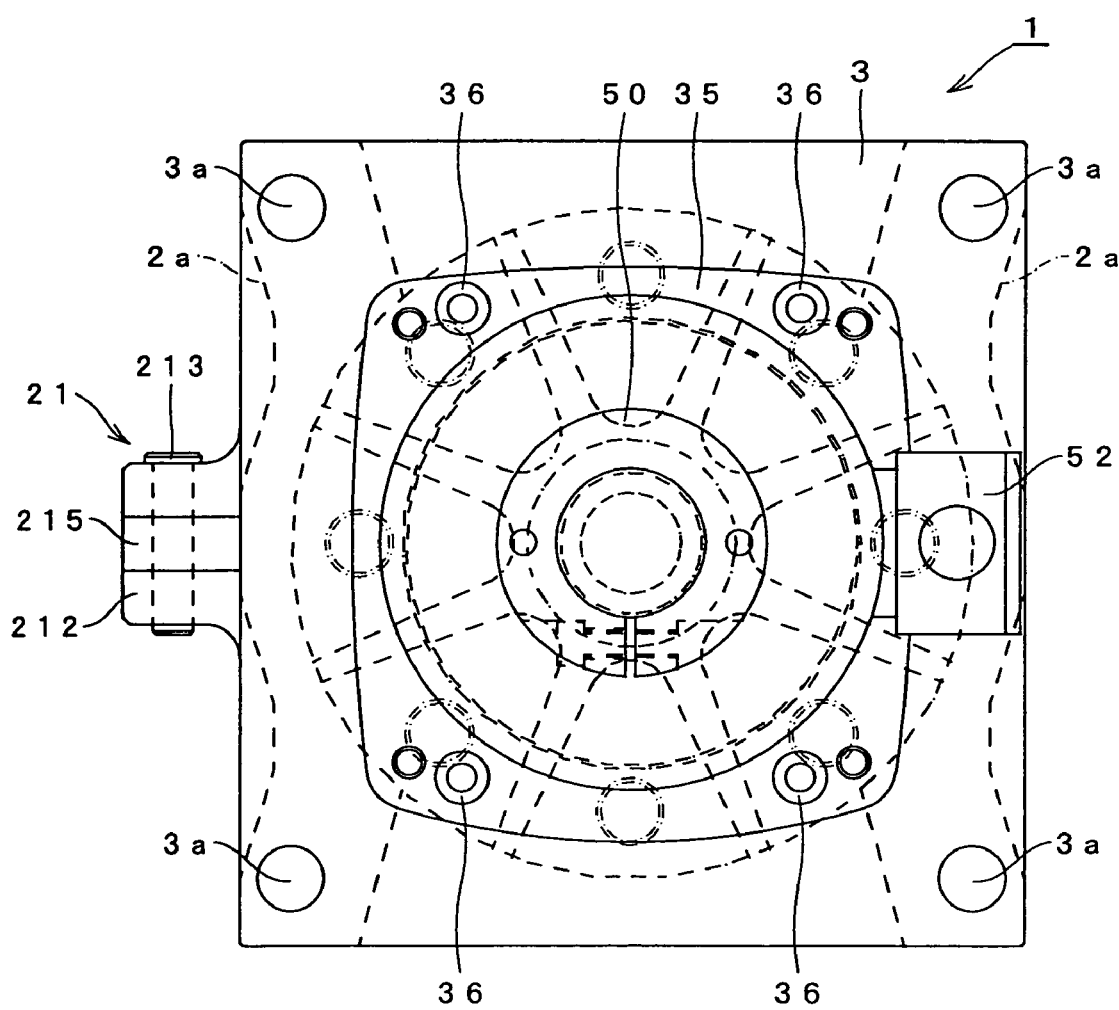
FIG. 6 is a right side elevation view of a rotary valve type magnetic foreign matter removal device according to an embodiment of the present invention.

As shown in FIG. 2, the rotary valve type magnetic foreign matter removal device 1 includes a square powder material feed port 9 (refer to FIG. 5) and a square powder material discharge port 10 (refer to FIG. 5). The powder material feed port 9 and the powder material discharge port 10 are installed in the upper portion and the lower portion, which are connected to a powder granular material feeding chamber 6. The powder material feed port 9 is formed with an opening in an upper surface of the rotary valve type magnetic foreign matter removal device 1. A feed port connection surface 11 is formed so as to connect to an above side powder material processing device (not shown) in an upper surface of the surface plate 2, a plurality of screw holes 12 for the attachment of the device are formed. On the other hand, as shown in FIG. 3, the powder material discharge port 10 is formed with an opening in a bottom surface of the rotary valve type magnetic foreign matter removal device 1. Wherein the inputted powder material from the powder material feed port 9 is transported by the rotation of the rotor 8 to the powder material discharge port 10. A discharge port connection surface 13 is formed so as to connect to a below side powder material processing device (not shown), a plurality of screw holes 14 for the attachment of a powder processing device are formed.

In addition, taking a side view, as shown in FIG. 5, the rotor 8 includes a tubular potion 15, a plurality of plate type blades 16 that spread radially from outer diameter side of the tubular potion 15. The rotor 8 divides the powder material feeding chamber 6 so as to form the troughs 17 (called pockets, hollow portions, etc.). As for the clearance between the rotor 8 and inner wall of the surface plate 2, a suitable interval is set according to a use. For example, when the rotor is used for an air lock purpose, the interval is maintained generally with high precision of equal to or less than 0.12 mm (0.10 mm through 0.06 mm for example, 0.07 mm through 0.08 mm in particular). Thereby a difference in pressure is maintained by preventing a leak of air in a place with difference in pressure between upper and lower direction such as the powder material feed port and the powder material discharge port and the air lock is performed suitably. The axis 7 is inserted into a hollow portion 80 of the tubular portion 15 and is fixed, as shown in FIG. 5, the axis 7 and the rotor 8 can rotates integrally in an arrow A direction by driving force of a motor 50 (refer to FIGS. 1 through 3). Thus, the inputted powder material from the powder material feed port 9 is transported by the rotation of the rotor 8 so as to take in the trough 17, is discharged from the powder material discharge port 10 to the below side. As for the shape of the tip of the blade 16 there are a normal type and an edge type generally, in this case, an edge 18 cut diagonally to rotary direction of the rotor 8 is adopted in order to non-wearing out and to enhance a supply efficiency.

As shown in FIGS. 2 through 8, a magnetic foreign matter attracting member 25 through 28 are arranged in the body casing 5. The magnetic foreign matter attracting member is composed of a non-magnetism cover 25, a magnet 26 (a permanent magnet is preferable), a side fixation plate 27 and a ring 28. One set of the non-magnetism cover 25, magnet 26 and ring 28 are each arranged in all of trough 17. Magnet 26 of designated shape (in this case, cylinder shape) is fitted into a hollow portion of the tubular non-magnetism cover 25 arranged with a horizontal direction (a spindle line direction of axis 7). The non-magnetism cover 25 is made of stainless steel, aluminum, aluminum alloy, hard plastic, etc. and includes a substance without magnetism or a substance with weak magnetism. The magnet 26 is composed of a substance with strong magnetism, for example, such as a substance with max 13000G in the magnet-surface magnetic flux density. It is possible that a magnetic foreign matter M which is a minute one or made of a weak thing of magnetism such as iron powder, a piece of iron (refer to FIG. 9), are attracted strongly on the surface of the non-magnetism cover 25 by magnetism of magnet 26. A pair of side fixation disk plates 27 are each fixed on the side of both ends of rotor 8 in a vertically direction (a radius direction of axis 7) so as to allow to rotate integrally with the rotor 8. An end part of the non-magnetism cover 25 is attached to the one side (the left) of the side fixation plate 27 detachably, and another end of the non-magnetism cover 25 is fitted in a hole of the other side of the side fixation plate 27 and is fixed. The ring 28 is set around the non-magnetism cover 25 movably, so that the removal work of the magnetic foreign matters becomes easily by the moving of the ring to right and left directions. The magnet 26 can be attached detachably to the side fixation plate 27 by a screw 29. The non-magnetism cover 25 and the magnet 26 are installed inside of the trough 17, an upward position in the trough is more desirable, and also are arranged in an axis direction of the axis 7. It is the reason to put on and off easily and to improve the removal efficiency of the magnetic foreign matter M. When one magnet 26 is installed in the trough 17, the magnet is arranged preferably in the center part or the upper part of the trough 17, and specially preferably in the upper and center part of the trough. If the magnet is arranged at much lower part, there is a fear that an upper powder material P in the trough 17 may not touch the non-magnetism cover 25.

When the magnetic foreign matters are attracted to the surface of the non-magnetism cover 25 by magnetism of the magnets 26 and accumulated, it is necessary to remove the magnetic foreign matter M regularly in order to avoid a lowering of removal efficiency. In addition, it is necessary to enable internal check, cleaning, disassembly of the rotary valve type magnetic foreign matter removal device 1, in order to dissolve the trouble of contamination (pollution by spoiled material) caused by the powder material such as foods, medicines, etc. and to promote hygiene security. Therefore the inspection door 20 is connected with the follower side plate 4 by hinge 21 with open-ability, and a cover back part 22 (refer to FIGS. 2 through 3) with a taper portion 22a is fitted to the inspection hole 40 in the follower side plate 4 (refer to FIG. 7). The hinge 21 includes a follower side projection 212 with an oval hole 211 formed in vertically direction (refer to FIG. 1), a hinge pin 213 inserted to the oval hole 211 movably in front and back, and a connection portion 215 linked up with the hinge pin 213 and fixed to the inspection door 20 by a screw 214. The inspection door 20 has a plurality of attachment holes 23 (refer to FIG. 8 right side), and knob volts 24 (refer to FIG. 4) can be attached so as to put in screw holes 42 (refer to FIG. 8 left side) in the predetermined portion of the follower side plate 4.

The axis 7 is formed in demension of enabling to fit in a hollow portion 80 (refer to FIG. 7), a concave portion 81 is formed in about radial direction in hollow central area of the axis end portion of the rotor 8 with a very small circumference wall 82 remained. The almost parts of an axis end 70 are fitted to a concave portion 81 with detachability. The axis end 70 is used to fix the rotor 8 to the axis 7 with detachability, and is fixed to the axis 7 and the rotor 8 by screw.

Figure 7:
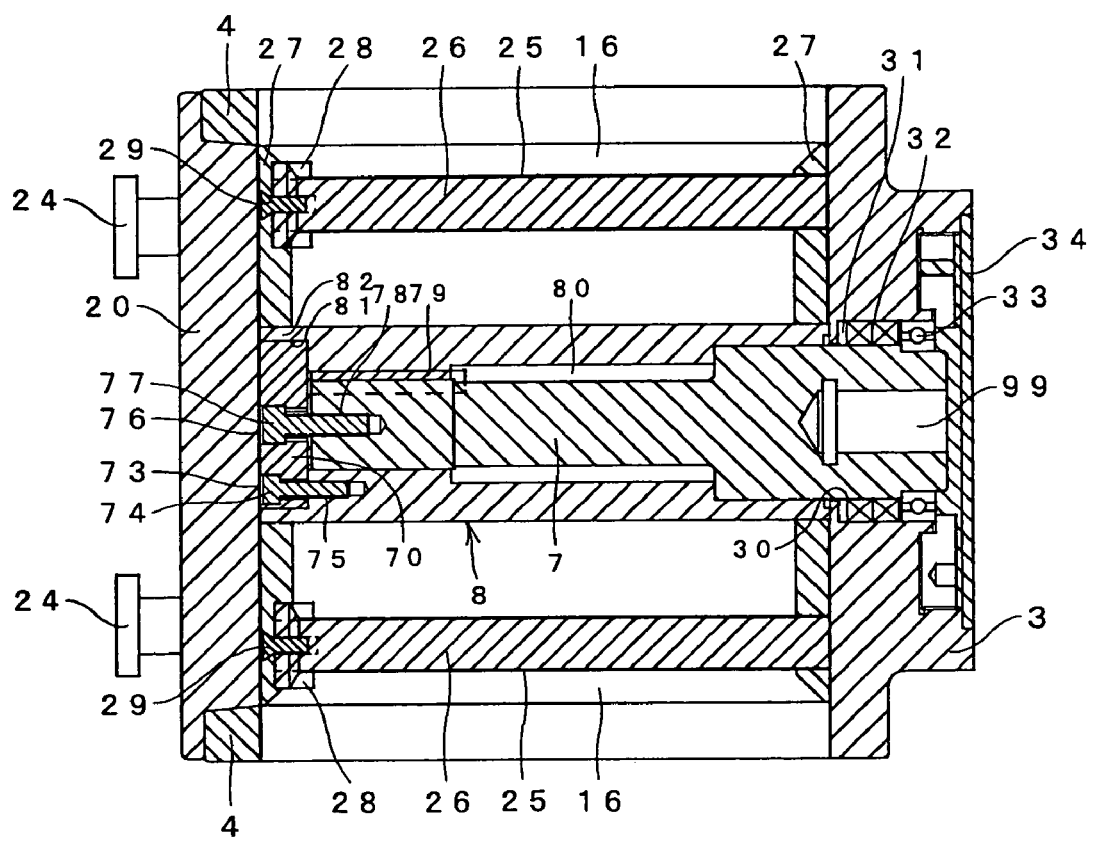
FIG. 7 is a sectional view taken on the line VII—VII in FIG. 4.
Figure 8:
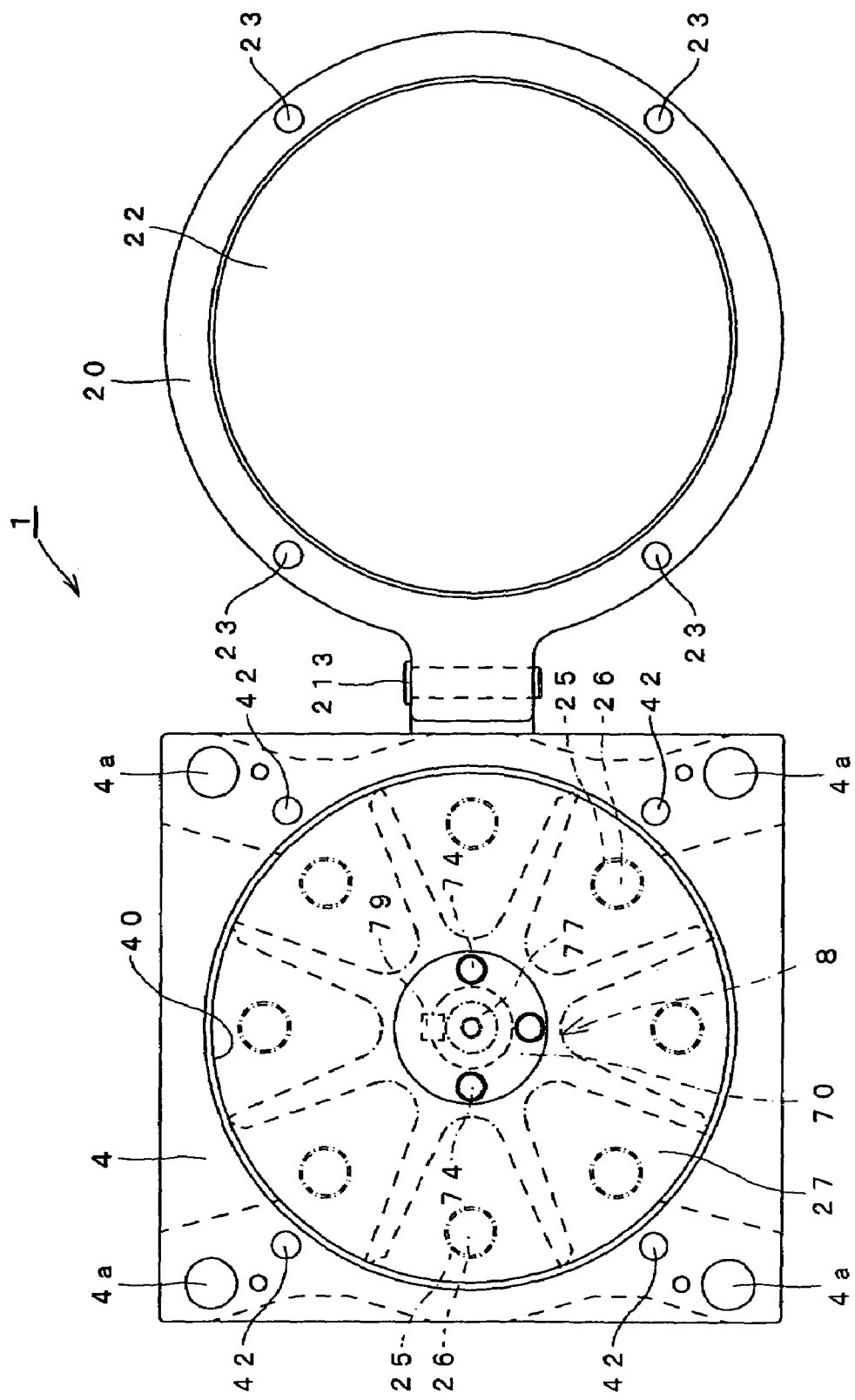
FIG. 8 is a left side elevation view of an opened inspection door.

As shown in FIG. 7, a plurality of attachment holes 73 are formed in the circumference location of the axis end 70, bolts 74 are attached so as to insert into screw holes 75 of the rotor 8. An attachment hole 76 is formed in the center portion of the axis end 70, wherein bolts 77 are inserted into a screw hole 78 which is formed in a center portion of the end of the axis 7. A parallel key 79 of the axis 7 is fitted in a groove of the rotor 8 so as to prevent skidding, transmits the rotation drive of the axis 7 to the rotor 8.

On the other hand, as shown in FIGS. 1 and 7, a drive side bearing 33 is arranged in inner wall of the through hole 30 of the drive side plate 3. In addition, a ring 31 for seal made by Teflon, a ring-shaped seal part 32 (an oil seal in this embodiment), a drive side bearing 33 that is single line deep groove ball bearing, are arranged in drive edge outsider lap sides of the axis 7. The drive side bearing 33 is fixed by a bearing stop 34. A motor rotating axis fixable hole 99 extends over determined length in the center of the right-side end of the axis 7, wherein a drive axis of the motor 50 is fitted and connected. A axis cover 51 of the motor 50 is connected with a cover 35 of the drive side plate 3 by volts 36. A connection line box 52 is provided with the motor 50 (refer to FIGS. 1 through 3).

Figure 9:
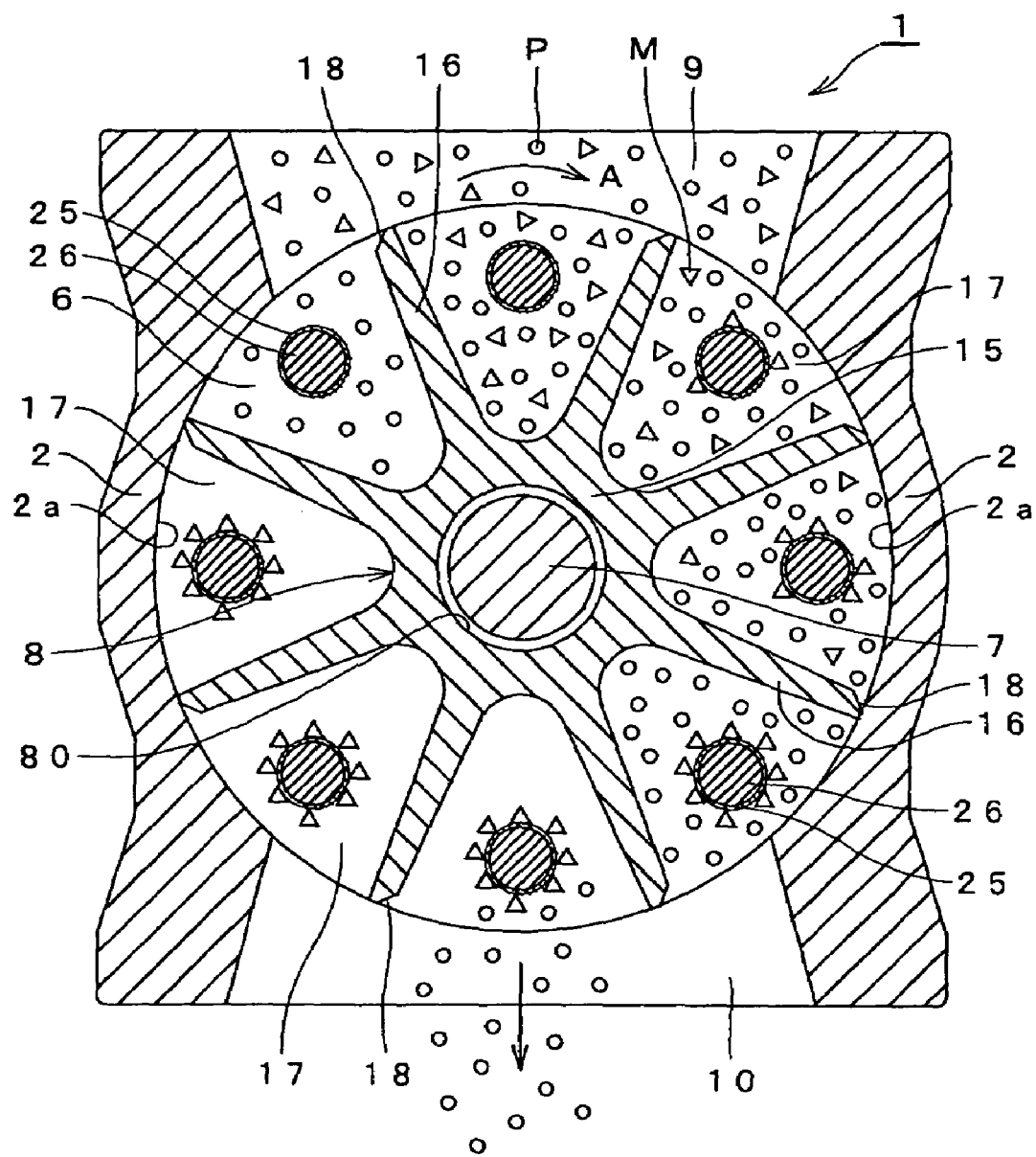
FIG. 9 is an explanatory elevation view showing the state that the magnetic foreign matters are attracted by the magnets.

According to the rotary valve type magnetic foreign matter removal device 1 mentioned above, while the device is running, the axis 7 rotates integrally with the magnetic foreign matters attracting member 25 through 28. As shown in FIG. 9, the powder granular material P fed to the powder granular material feed port 9 is poured toward the trough 17 and is stored in the trough with rotation, the trough becomes a closed space because of the edge 18 contacting with the arc surface 2a. There is a time to move a semicircle together with the magnet 26, with taking in the powder granular material P within the trough 17. While the powder granular material P moves the semicircle, the magnetic foreign matter M is attracted to the surface of the non-magnetism cover 25 by the magnetic field works being produced from the magnets 26. Because the powder granular material P poured to the powder material discharge port 10 does not receive influence of the magnets 26 in the powder material discharge port 10, the powder granular material P is separated from the non-magnetism cover 25 by gravitation. The powder granular material P is discharged below from the powder material discharge port 10. On the other hand, the magnetic foreign matter M continues to rotate with being attracted to the surface of the non-magnetism cover 25.

As shown in two pointed chain-lines of FIG. 2 and FIG. 3, when the inspection door 20 is opened for inside inspection by taking the knob volt off, only one side of the axis 7 is supported by the motor 50 and the drive side bearing 33. After the volt 77 is took off, the rotor 8, the magnets 26, the fixation plate 27 and the ring 28 are detached from the axis 7 can be put out through the inspection hole 40. Thereby collection of magnetic foreign matter M, inside-inspection, and cleaning are performed with ease. The screw 29 is took off, if it is necessary, the magnets 26 are excluded so as to pull out from the non-magnetism cover 25, the ring 28 are moved on the circumference of the non-magnetism cover 25. Thereby the ring 28 can brush off the magnetic foreign matter M, the magnetic foreign matters M are corrected easily. After the inspection is over, the inspection door 20 is closed in the reverse manner of the mentioned procedure and is fixed to the follower side plate 4 by the knob volt 24. The axis 7 is supported at the one end and the device is assembled again. Also, the both ends bearing structure that a bearing is installed in the inspection door 20 may be preferable.

Figure 10:
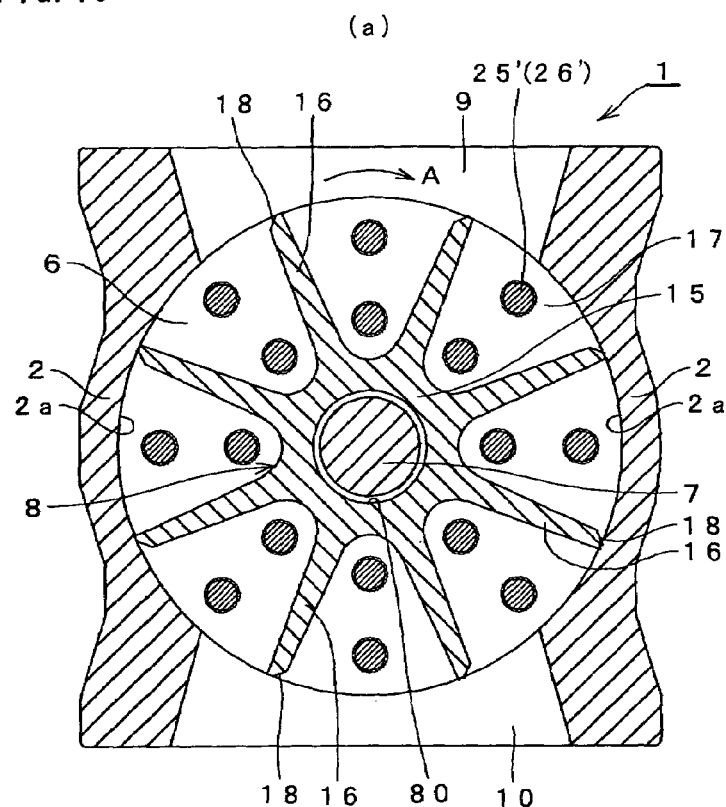
FIG. 10(a) and FIG. 10(b) are sectional views of modified modes of rotary valve type magnetic foreign matter removal devices.
Figure 10:
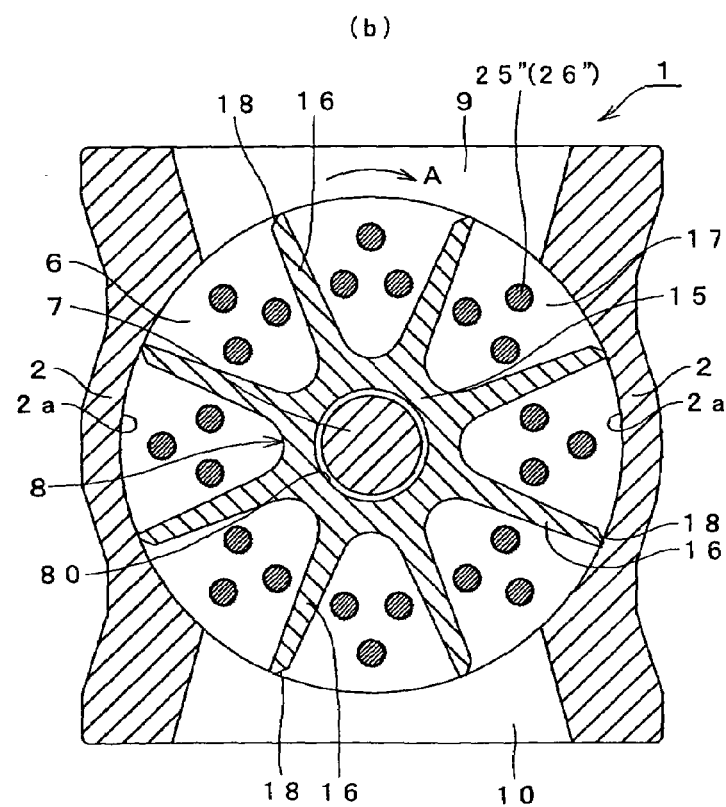

FIG. 10 (*a*) show a modified mode of the rotary valve type magnetic foreign matter removal device 1, a pair of non-magnetism cover 25' and magnet 26' are arranged in each trough 17. FIG. 10 (*b*) show a further modified mode of the rotary valve type magnetic foreign matter removal device 1, three of non-magnetism cover 25" and magnet 26" are arranged in each trough 17. These shapes, number, arrangement position can be adopted appropriately in the range that a removal effect of the magnetic foreign matter M is maintained.

According to the rotary valve type magnetic foreign matter removal device 1 mentioned above, the trough 17 is able to rotate a half in a static state (the state that stayed) with enclosing the falling powder granular material P. Also, because the powder granular material P within the trough has enough time to come close to the non-magnetism cover 25 and the magnet 26, the magnetic foreign matter can be attracted with high efficiency.

In addition, the ministry space and energy saving are realized because a pneumatic-conveyance of powder granular material P and removal of the magnetic foreign matter M can be performed simultaneously. Further, as a rotary valve, the high removal efficiency of the magnetic foreign matter M prevents the magnetic foreign matter M to be caught between the rotor 8 and the arc surface 2*a*. In particular, when this rotary valve is applied to air lock that demands a precision clearance, it has an advantage. In an application example to the powder granular material transportation, when iron impurities were sieved and removed by a sieving process (a sifter etc.), the rest iron impurities as the magnetic foreign matter M is removed by the rotary valve type magnetic foreign matter removal device 1. Of course, when the rotary valve type magnetic foreign matter removal device 1 is used in a front step of the sieving process, it is prevented effectively that the magnetic foreign matter M are caught to the blade 16.

Further, after the powder granular material P is stored in the trough 17, on the way to moving inside the powder granular material feeding chamber 6 the magnetic foreign matter is magnetically captured by the magnets 26. Thereby dead space decreases and size reduction of whole device is realized. Because the blade 16 plays a scraper and prevents the powder granular material sticking to a lap inside of the powder granular material feeding chamber 6, the blade 16 prevents effectively contamination. Because there is hardly dead space, the contamination caused by the powder granular material P can be prevented. Thereby an excellent sanitation is offered.

When the inspection door 20 is opened and the magnetic foreign matter M is removed, because the ring 28 hangs and brushes off the magnetic foreign matter M, it is easy to collect the magnetic foreign matter M. In addition, as the inspection door 20 can be opened and shut at will, the magnetic foreign matter M can be correct and control easily, so this device is suitable to the processing device for foods, medicines etc. which is demanded to has sanitary nature in particular.

Magnetism of the magnet 26 is hard to disperse, by utilizing nonferrous material such as an aluminum material, stainless steel etc. to the body casing 5.

This invention should not be confined to the embodiments described, and can be added changes to in the range that does not depart from technical thought of the present invention.

The invention is intended to cover all modifications, equivalents and alternative falling within the spirit and scope of the invention as defined by the appended claims. For example, the structure that the magnetic foreign matter M is attracted directly with the magnet 26 and the magnet 26 with the magnetic foreign matter M is removed may be adopted.

INDUSTRIAL APPLICABILITY

According to the invention of the claims, a separation removal rate of the magnetic foreign matters mixed between powder granular material is improved, a pneumatic-conveyance function or an air locker function is added besides the magnetic foreign matter removal, the size reduction of the whole device is attained.

The invention claimed is:

1. A rotary valve type magnetic foreign matter removal device comprising:
   a rotary valve allowing a rotor to be stored rotatably in a tubular powder granular material feeding chamber in a casing, storing and feeding powder granular material received from a powder granular material feed port to said trough of said rotor, and discharging said powder granular material from a powder granular material discharge port to the outside, and having an inspection door that opens and closes an inspection hole provided in a side surface of said casing; and
   a magnetic foreign matter attracting member which includes:
   fixable plates that are attached to both sides of said rotor,
   a plurality of bar magnets fixed or connected to said fixable plates with detachability and arranged in each of a plurality of troughs of said rotor to allow said arrangements to rotate integrally with said rotor, and
   non-magnetized or very little magnetized cylindrical covers covering said bar magnets to be put into or put out,
   wherein said bar magnets and said covers are connected to said fixable plates such that said powder granular material stored in said troughs surround and contact with said covers,
   wherein magnetic foreign matter mixed in said powder granular material are attached to said magnetic foreign matter attracting member,
   wherein said inspection door is opened to allow said magnetic foreign matter attached to said magnetic foreign matter attracting member to be removed,
   wherein said rotor, bar magnets, covers and fixable plates rotate integrally with said axis, and
   wherein said inspection door is opened and said rotor, bar magnets, covers and fixable plates are detached from said axis and are put out through said inspection hole.

2. A rotary valve type magnetic foreign matter removal device comprising:
   a casing allowing a powder granular material feed port and a powder granular material discharge port to be installed in an upper direction and a lower direction, and having a powder granular material feeding chamber being connected to said powder granular material feed port and said powder granular material discharge port;
   an axis installed rotatably in said casing;
   a rotor fixed to said axis and defining said powder granular material feeding chamber to form a plurality of troughs by having a plurality of blades extending radially;
   a magnetic foreign matter attracting member which includes:

a plurality of fixable plates that are attached to both sides of said rotor, a plurality of bar magnets connected to said fixable plates with detachability and arranged in each said troughs of said rotor to allow said bar magnets to rotate integrally with said rotor, and non-magnetized or very little magnetized cylindrical covers covering said bar magnets to be put into or put out, wherein said bar magnets and said covers are connected to said fixable plates such that said powder granular material stored in said troughs surround and contact with said covers;

a drive side plate having a drive side bearing that rotatably disposes said axis;

a follower side plate having an inspection hole; and an inspection door that opens and closes said inspection hole, wherein said powder granular material is poured from said powder granular material feed port into said troughs, said magnetic foreign matter mixed in said powder granular material are attached to said magnetic foreign matter attracting member with rotating said rotor, said powder granular material is discharged from said powder granular material discharge port, wherein said rotor, bar magnets, covers and fixable plates rotate integrally with said axis, and wherein said inspection door is opened and said rotor, bar magnets, covers and fixable plates are detached from said axis and are put out through said inspection hole.

3. The rotary valve type magnetic foreign matter removal device according to claim 1, wherein said bar magnets and said covers are arranged in a center part of an upper part of said trough.

4. The rotary valve type magnetic foreign matter removal device according to claim 3, wherein said bar magnets and said covers are arranged in an upper and center part of said trough.

* * * * *